(No Model.)

J. H. WIESTNER.
SPRING CLIP FOR VEHICLES.

No. 343,879. Patented June 15, 1886.

Witnesses:
John E. Parker
William F. Davis

Inventor:
John H. Wiestner
by his Attorneys
Howson & Son

UNITED STATES PATENT OFFICE.

JOHN H. WIESTNER, OF PHILADELPHIA, PENNSYLVANIA.

SPRING-CLIP FOR VEHICLES.

SPECIFICATION forming part of Letters Patent No. 343,879, dated June 15, 1886.

Application filed April 1, 1886. Serial No. 197,426. (No model.)

*To all whom it may concern:*

Be it known that I, JOHN H. WIESTNER, a citizen of the United States, residing in Philadelphia, Pennsylvania, have invented certain Improvements in Spring-Clips for Axles of Vehicles, of which the following is a specification.

The object of my invention is to provide a clip-plate with a simple and efficient device for preventing the loosening of the nuts on the clips, whereby a spring is secured to the axle of a vehicle; and this object I attain in the manner which I will now proceed to describe, reference being had to the accompanying drawings, in which—

Figure 1:
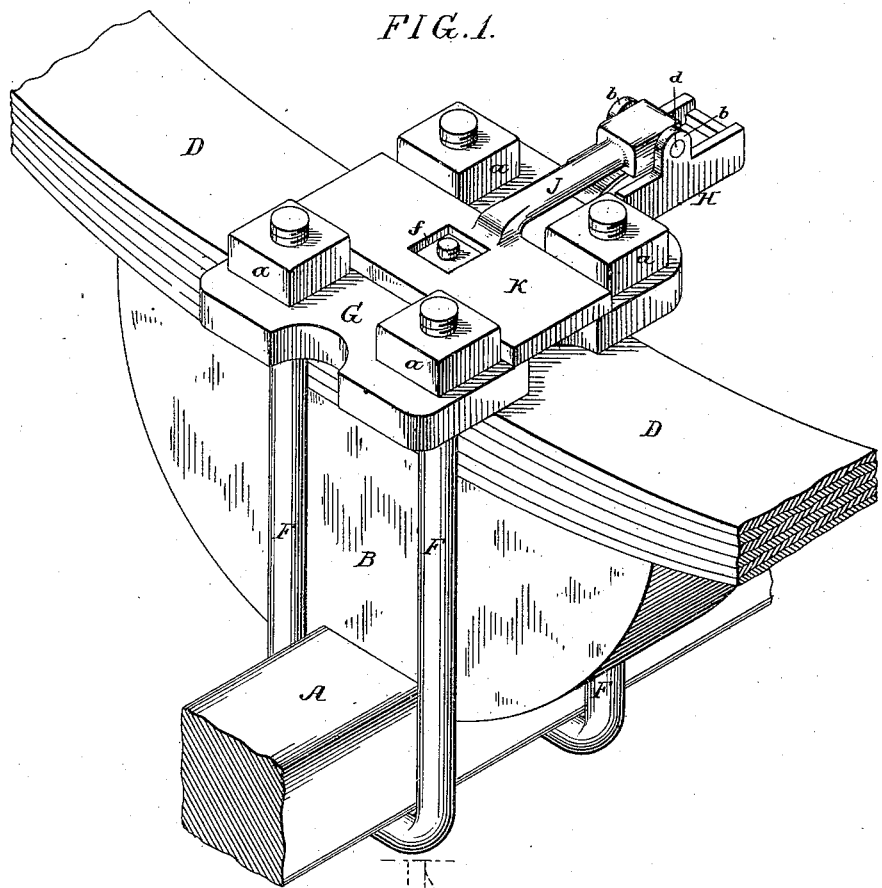
Figure 2:
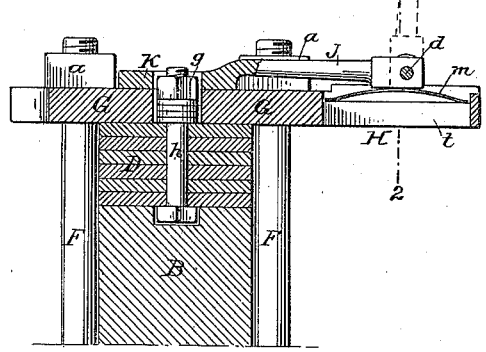
Figure 3:
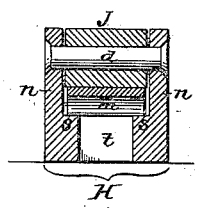

Figure 1 is a perspective view of a pair of clips and a clip-plate provided with a nut-retainer constructed in accordance with my invention, the spring-block and part of the spring and axle being also shown; Fig. 2, a transverse section of the spring-clip, plate, and retainer, with portions of the clips and their nuts shown in elevation, and Fig. 3, a transverse section on the line 1 2, Fig. 2, on a larger scale than said figure.

A represents part of the axle of a vehicle; B, the spring-block mounted thereon, and D part of one of the springs, the latter being confined to the spring-block in the usual manner by means of clips F, passing beneath the axle, the upper ends of the clips projecting through openings in a clip-plate, G, and these projecting ends of the clips being provided with nuts *a*, as shown.

In order to prevent the accidental loosening of these nuts, such as is likely to be caused by the constant jarring or shaking to which the spring and clip-plate are subjected, I provide one side of said clip-plate with a projection, H, to ears *b*, on which is hung, by means of a pivot-pin, *d*, an arm, J, the end of which has a bar, K, adapted to fit snugly between the pairs of nuts carried by the opposite clips, said bar having also a central opening, *f*, for the reception of the nut *g* and the upper end of the bolt *h*, whereby the leaves of the spring D are confined in the usual manner. When the arm J is in the position shown in Fig. 1, the bar K of the same serves to lock all five of the nuts; but when it is desired to turn any of the nuts the arm J can be thrown up to the position shown by dotted lines in Fig. 2, so as to release said nuts from the control of the bar, the arm being self-retaining in the position shown by dotted lines, owing to the fact that the butt of the arm is squared, and is acted upon by a spring, *m*, which is contained between opposite flanges *n* on the projection H, and is supported by shoulders *s* therein. When the arm J is depressed, this spring also serves to retain it and prevent it from rattling or from being accidentally displaced from its locking position.

In order to prevent the accumulation on the projection H of dirt, which would tend to clog the action of the spring *m*, or of moisture, which might rust said spring, I form in said projection a slot, *t*, so that no opportunity is afforded for the lodgment of dirt or accumulation of moisture therein.

I am aware that a locking-arm pivoted to a washer-plate and constructed to lock a single nut has been heretofore devised, and also that such pivoted locking-arm has been acted upon by a spring to retain it in either the raised or depressed position; hence these features, broadly, I do not claim; but

I claim as my invention—

1. The combination of the spring-clips of a vehicle-axle and their nuts with a clip-plate and an arm hung to a projection on said clip-plate, and having a bar constructed to fit between the opposite pairs of nuts, and thereby lock all four of the same, all substantially as specified.

2. The combination of the spring-clips of a vehicle-axle and their nuts, the spring and its confining bolt and nut, the clip-plate, and an arm hung to a projection on said clip-plate, and having a bar constructed to fit between the opposite pairs of nuts and lock all four of the same, said bar also having an opening for the reception of the spring-confining bolt and nut, all substantially as specified.

In testimony whereof I have signed my name to this specification in the presence of two subscribing witnesses.

JOHN H. WIESTNER.

Witnesses:
WM. F. DAVIS,
HARRY SMITH.